United States Patent
Kelly

[11] Patent Number: 6,065,573
[45] Date of Patent: May 23, 2000

[54] ADJUSTABLE ENERGY ABSORPTION DEVICE WITH BREAK-OFF ADJUSTMENT KNOB

[75] Inventor: Jeffrey Thomas Kelly, Orchard Park, N.Y.

[73] Assignee: Enidine, Inc., Orchard Park, N.Y.

[21] Appl. No.: 09/146,782

[22] Filed: Sep. 4, 1998

[51] Int. Cl.[7] .................................................. F16F 9/44
[52] U.S. Cl. ..................... 188/319.1; 188/319.2
[58] Field of Search ................................ 188/287, 315, 188/322.14, 319.1, 319.2; 267/175, 177, 221, 286, 291

[56] References Cited

U.S. PATENT DOCUMENTS

| | | | |
|---|---|---|---|
| 3,351,160 | 11/1967 | Koning et al. | 188/319.2 |
| 3,420,341 | 1/1969 | Keehn, II | 188/319.1 |
| 3,827,538 | 8/1974 | Morgan | 188/319.1 |
| 3,955,655 | 5/1976 | Pornin | 188/319.2 |
| 4,036,335 | 7/1977 | Thompson et al. | 188/319.1 |
| 4,709,791 | 12/1987 | Houghton | 188/315 |
| 5,598,904 | 2/1997 | Spyche, Jr. | 188/287 |
| 5,862,895 | 1/1999 | Ricard | 188/289 |
| 5,954,318 | 9/1999 | Kluhsman | 267/221 |

Primary Examiner—Chris Schwartz

[57] ABSTRACT

An adjustable energy absorption device whose setting can be rendered tamper-proof, and a method of rendering the setting of an adjustable energy absorption device tamper-proof. The device is of the type that includes an outer cylinder and an adjustment member extending from one end thereof, the rotational position of the adjustment member determining the resisting force setting of the device. A frangible portion connects a first end portion of the adjustment member to a second end portion thereof, the first end portion being freely accessible from outside the outer cylinder, and the second end portion being retained within the outer cylinder. The resisting force setting of the device is adjusted to a predetermined setting by gripping the first end portion and rotating the adjustment member. The first end portion is then broken away from the second end portion at the frangible portion to thus render the setting of the device tamper-proof and, for all practical purposes, permanent.

15 Claims, 2 Drawing Sheets

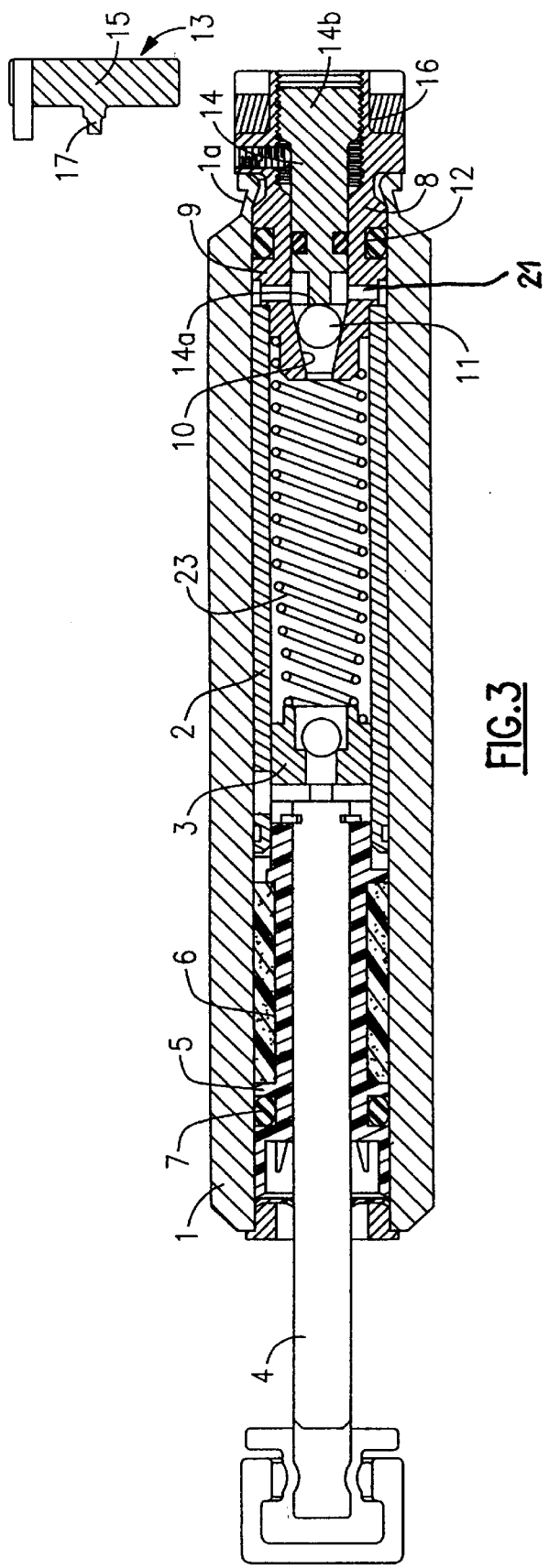
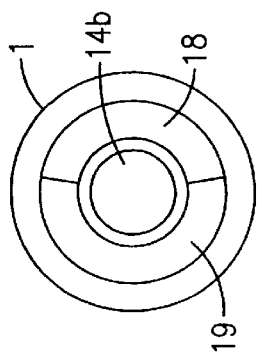
FIG.3
FIG.4

ADJUSTABLE ENERGY ABSORPTION DEVICE WITH BREAK-OFF ADJUSTMENT KNOB

FIELD OF THE INVENTION

The present invention relates to an adjustable, tamper-proof energy absorption device that can be used in all types of applications where it is necessary to absorb shock or control motion between two members movable relative to one another. Such devices are typically used to decelerate and control moving loads and mechanisms in equipment such as robotic assembly machines, packaging machinery., and automated storage and retrieval systems.

BACKGROUND OF THE INVENTION

When an original equipment manufacturer (OEM) installs an absorption device in a particular piece of equipment, it is necessary that the device have damping characteristics that are specifically suited for the particular equipment application. For example, an absorption device used to decelerate a small, lightweight pallet on a conveyor system would have different damping characteristics than an absorption device used to decelerate a large, heavy pallet on a larger conveyor system.

Conventional absorption devices are known wherein the resisting force setting of the device is preset for a particular application; no adjustment by the OEM is possible. This makes it impossible to mass produce a "generic" absorption device that can be selectively tuned by an OEM for various different equipment applications.

Adjustable absorption devices have been known wherein the OEM can adjust the resisting force setting of the device to suit the needs of a particular equipment application. U.S. Pat. Nos. 4,709,791 and 5,598,904, owned by the same assignee as the present application, disclose such an absorption device. Other conventional absorption devices have been known that enable the OEM to adjust the resisting force setting of the absorption device during installation, and then lock the device at the desired setting.

However, in both cases the end user of the equipment can unlock the device and adjust the resisting force of the absorption device, thus resulting in the possibility that the device later will be misadjusted for a particular application to the point where the absorption characteristics of the absorption device are ineffective for the particular application.

It would be desirable to provide an energy absorption device that allows the OEM to select the resisting force setting of the device to meet the particular requirements of the equipment on which the device is installed, lock the device at that setting, and then render the device tamper-proof as to the end user of the equipment.

SUMMARY OF THE INVENTION

It is an object of the present invention to provide an energy absorption device that allows the OEM to select the resisting force setting of the device to meet the particular requirements of the equipment on which the device is installed, lock the device at that setting, and then render the device tamper-proof as to the end user of the equipment.

In accordance with one embodiment of the invention, the energy absorption device includes an outer cylinder, an inner shock tube arranged within the outer cylinder, a piston slidably disposed within the shock tube, a piston rod extending from the piston and adapted to be connected to a body in motion, a damping fluid reservoir located within the interior of the outer cylinder, a passage providing fluid communication between the fluid reservoir and the interior of the shock tube, a valve for controlling the flow of fluid between the fluid reservoir and the interior of the shock tube, and an adjustment member for controlling the valve and thus controlling the resisting force setting of the energy absorption device. The adjustment member has a first end portion freely accessible from outside the device, a second end portion retained within the device, and a frangible portion connecting the first end portion to the second end portion. The first end portion is gripped and rotated to rotate the adjustment member and thus adjust the resisting force of the energy absorption device to a predetermined setting, and then the first end portion is broken away from the second end portion at the frangible portion to thus render the setting of the device tamper-proof.

In accordance with one embodiment of the method of the present invention, the resisting force setting of an adjustable energy absorption device of the type including an outer cylinder and an adjustment member extending from one end thereof is rendered tamper-proof by (i) providing the adjustment member with a first end portion freely accessible from outside the device, a second end portion retained within the device, and a frangible portion connecting the first end portion to the second end portion, (ii) rotating the first end portion to rotate the adjustment member to select a predetermined resisting force setting for the device, and (iii) breaking the first end portion away from the second end portion at the frangible portion to thus render the setting of the device tamper-proof.

In preferred embodiments of the present invention the diameter and thickness of the frangible portion are substantially less than the diameter and thickness of the first and second end portions. More preferably, the diameter of the frangible portion is thinnest at its connection point to the second end portion of the adjustment member, such that the frangible portion remains connected to the first end portion after the first end portion is broken away from the second end portion.

It is also preferred that the axial length of the frangible portion is sufficient to provide a clearance between the first end portion of the adjustment member and the remaining parts of the absorption device, so as to enable a tool (e.g., a screw driver) to be wedged therebetween and break the first end portion away from the second end portion.

BRIEF DESCRIPTION OF THE DRAWINGS

FIG. 3 is a cross-sectional view of the energy absorption device shown in FIG. 1 after the knob has been broken away from the device; and FIG. 4 is an end view of the device shown in FIG. 3.

DETAILED DESCRIPTION OF THE PREFERRED EMBODIMENT

Figure 1:
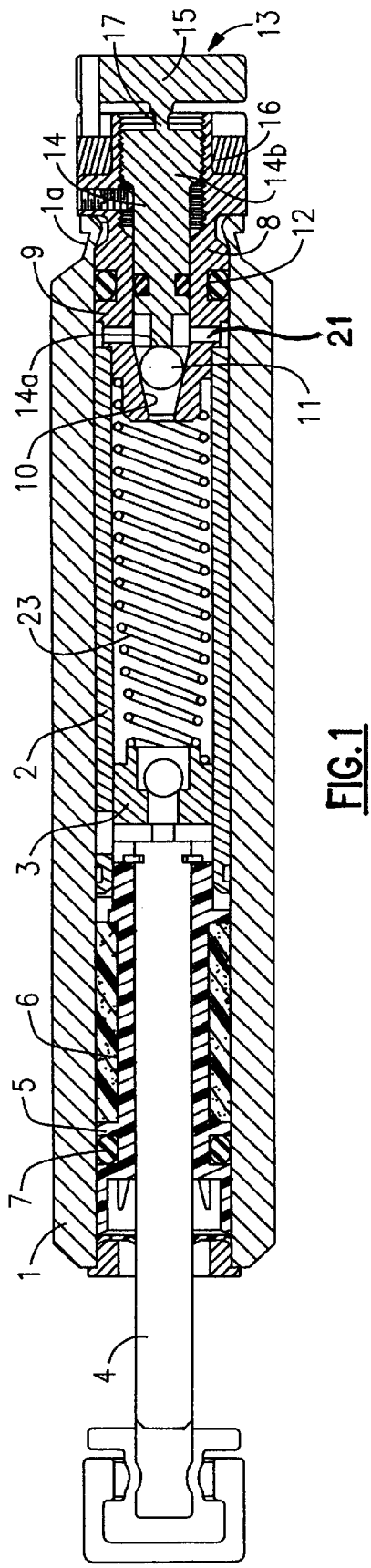
FIG. 1 is a cross-sectional view of an energy absorption device embodying the present invention.

FIG. 1 shows an adjustable energy absorption device embodying the present invention. The device includes an outer cylinder 1 having a shock tube 2 retained therein. A piston 3 is slidably disposed within shock tube 2 and includes a piston rod 4 extending therefrom outside cylinder 1 for receiving an impact from a body in motion (not shown). A bearing 5 is fixed in a first end of outer cylinder 1, and provides a bearing interface for piston rod 4. Bearing 5 also houses a fluid accumulator 6 for holding damping fluid. Bearing 5 includes an O-ring seal 7 to prevent leaking of the damping fluid outside cylinder 1.

A cylinder end 8 is fixed in the other end of outer cylinder 1, and is held in place by crimping outer cylinder 1 at 1a. One end portion 9 of cylinder end 8 is disposed within shock tube 2, and includes a tapered seat 10 for receiving a ball 11. An O-ring seal 12 prevents leaking of damping fluid out of outer cylinder 1 past cylinder end 8.

An adjustment member 13, preferably made of metal, is arranged at the second, opposed end of outer cylinder 1, and includes a main body portion 14 disposed within cylinder end 8 and a knob 15 accessible outside the device. The terminal end 14a of main body portion 14 contacts ball 11 to force it against tapered seat 10 of cylinder end 8. The opposite end 14b of main body portion 14 is threaded to engage complementary threads formed on the inner surface of a reduced diameter portion 16 of cylinder end 8.

Knob 15 is connected to main body portion 14 of adjustment member 13 by a frangible member 17. The diameter of frangible member 17 is large enough such that it will not break during rotation of knob 15 or if knob 15 is subjected to accidental impact force (e.g., as a result of dropping). However, the diameter of frangible member 17 is small enough to allow knob 15 to be broken easily from main body portion 14 when desired.

Figure 2:
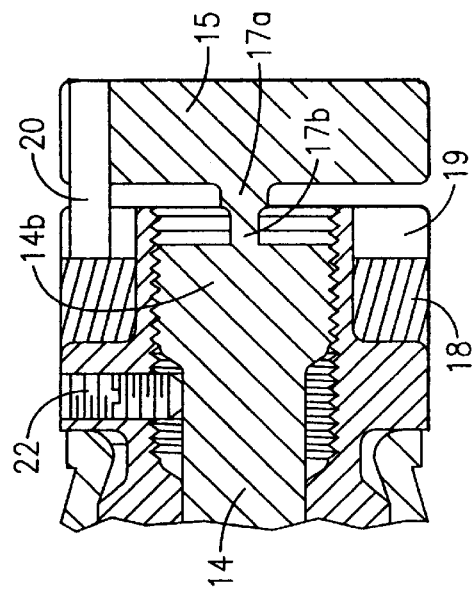
FIG. 2 is an enlarged view of the knob-end portion of the device shown in FIG. 1.

FIG. 2 is an enlarged view of the knob end portion of the device shown in FIG. 1, and shows that frangible portion 17 includes a first region 17a of reduced diameter and a second region of even greater reduced diameter 17b. The diameter of frangible portion 17 is thinnest in region 17b where it is connected to main body portion 14. This insures that, when knob 15 is broken away from main body portion 14, there will be little if any remnant part left on main body portion 14 for the end user to attempt to grip and turn.

An annular gauge member 18 is disposed around reduced diameter portion 16 of cylinder end 8. Gauge member 18 includes indicia printed thereon to identify different resistance settings of the absorption device. A slot 19 (FIGS. 3 and 4) is cut in the end face of gauge member 18, and extends slightly more than 180° around the perimeter thereof. A pin 20 extends from knob 15 into slot 19 to limit the extent to which knob 15 can be rotated. This prevents the end user from completely unthreading and removing adjustment member 13 from the device.

When in use, the absorption device would be installed between two bodies whose relative movement is to be controlled. Typically, outer cylinder 1 would be mounted to a fixed body and the end of piston rod 4 would be impacted by a body in motion. The resisting force setting of the device would be adjusted by rotating knob 15 to allow a space to form between ball 11 and tapered seat 10. Specifically, rotation of knob 15 changes the axial position of terminal end 14a, which allows damping fluid to flow from the interior of shock tube 2, around ball 11, through an aperture 21 formed in cylinder end 8, and into a fluid accumulator 6 and behind piston 3 through a passage 30 between the outside surface of shock tube 2 and the inside surface of outer cylinder 1. This type of damping is well known, and is employed in Enidine models OEM .25, OEM .35 and OEM .5.

Knob 15 is rotated to set the resisting force and then a locking set screw 22 which passes through cylinder end 8 to contact the outer surface of main body portion 14, is tightened to prevent further rotation of knob 15. If it is desired to make the setting permanent, a screw-driver or like device is wedged between gauge member 18 and knob 15 to break frangible member 17. FIGS. 3 and 4 show the device in cross-sectional and end views, respectively, after knob 15 has been broken away from the device. Once knob 15 is broken away from main body portion 14 of adjustment member 13, it is practically impossible to change the setting of the absorption device. FIG. 3 shows that virtually nothing remains of frangible member 17 on main body portion 14, and moreover, the end of main body portion 14 is recessed within cylinder end 8 to such an extent to make it virtually impossible to access a sufficient portion of main body portion 14 with any gripping tool, such as pliers. Accordingly, the resisting force setting of the device can be set by the OEM and then rendered tamper-proof to the end user of the equipment on which the device is installed.

The device and method in accordance with the present invention provide a substantial contribution in the field of adjustable absorption devices, in that an OEM can selectively adjust the damping setting of a "generic" absorption device, lock the setting, and then easily render the setting of the device tamper-proof and, for all practical purposes, permanent with respect to the end user.

While the present invention has been described with reference to a particular preferred embodiment, it will be understood by those skilled in the art that various modifications and the like could be made thereto without departing from the spirit and scope of the invention as defined in the following claims.

What is claimed is:

1. An adjustable energy absorption device, comprising:

an outer cylinder;

an inner shock tube arranged within said outer cylinder;

a piston slidably disposed within said shock tube;

a piston rod extending from said piston and adapted to receive an impact from a body in motion;

a damping fluid reservoir located within the interior of said outer cylinder;

means for providing fluid communication between said fluid reservoir and the interior of said shock tube;

valve means for controlling the flow of fluid between said fluid reservoir and the interior of said shock tube; and an adjustment member for controlling said valve means and thus controlling the resisting force setting of the energy absorption device, said adjustment member having a first end portion freely accessible from outside said absorption device, a second end portion retained within said absorption device, and a frangible portion connecting said first end portion to said second end portion;

wherein the resisting force of the energy absorption device is adjusted to a predetermined setting by rotating said first end portion of said adjustment member, and then said first end portion is broken away from said second end portion at said frangible portion to thus render the setting of the device tamper-proof.

2. The adjustable energy absorption device according to claim 1, wherein the diameter and thickness of said frangible portion are substantially less than the diameter and thickness of said first and second end portions.

3. The adjustable energy absorption device according to claim 1, wherein the diameter of said frangible portion is thinnest at its connection point to said second end portion of said adjustment member, such that substantially all of said frangible portion remains connected to said first end portion after said first end portion is broken away from said second end portion.

4. The adjustable energy absorption device according to claim 1, further comprising a cylinder end fixed in one end of said outer cylinder, and said second end portion of said adjustment member is retained within said cylinder end.

5. The adjustable energy absorption device according to claim 4, wherein the axial length of said frangible portion is sufficient to provide a clearance between said first end portion and said cylinder end, to enable a tool to be wedged therebetween and break said first end portion away from said second end portion.

6. The adjustable energy absorption device according to claim 1, further comprising locking means for preventing movement of said adjustment member relative to said outer cylinder.

7. A method of rendering the resisting force setting of an adjustable energy absorption device tamper-proof, the device including an outer cylinder and an adjustment member extending from one end thereof, the rotational position of the adjustment member determining the resisting force setting of the device, comprising the steps of:

providing the adjustment member with a first end portion freely accessible from outside the absorption device, a second end portion retained within the absorption device, and a frangible portion connecting the first end portion to the second end portion;

rotating the adjustment member to select a predetermined resisting force setting for the device; and breaking the first end portion away from the second end portion at the frangible portion to thus render the setting of the device tamper-proof.

8. The method of claim 7, wherein the diameter and thickness of the frangible portion are substantially less than the diameter and thickness of both the first and second end portions.

9. The method of claim 7, wherein the axial length of the frangible portion is sufficient to provide a clearance for receiving a tool to break the first end portion away from the second end portion.

10. The method of claim 7, further comprising, prior to the breaking step, the step of locking the rotational position of the adjustment member relative to the outer cylinder.

11. In an adjustable energy absorption device of the type including an outer cylinder and an adjustment member extending from one end thereof, the rotational position of the adjustment member determining the resisting force setting of the device, wherein the improvement comprises:

a frangible portion connecting a first end portion of the adjustment member to a second end portion thereof, said first end portion being freely accessible from outside said absorption device, and said second end portion being retained within said absorption device;

wherein the resisting force setting of the device is adjusted to a predetermined setting by rotating said first end portion of said adjustment member, and then said first end portion is broken away from said second end portion at said frangible portion to thus render the setting of the device tamper-proof.

12. The adjustable energy absorption device according to claim 11, wherein the diameter and thickness of said frangible portion are substantially less than the diameter and thickness of said first and second end portions.

13. The adjustable energy absorption device according to claim 11, farther comprising a cylinder end fixed in one end of said outer cylinder, and said second end portion of said adjustment member is retained within said cylinder end.

14. The adjustable energy absorption device according to claim 13, wherein the axial length of said frangible portion is sufficient to provide a clearance between said first end portion and said cylinder end, to enable a tool to be wedged therebetween and break said first end portion away from said second end portion.

15. The adjustable energy absorption device according to claim 11, further comprising locking means for preventing movement of said adjustment member relative to said outer cylinder.

\* \* \* \* \*